US012619270B2

(12) United States Patent
Lee et al.

(10) Patent No.: US 12,619,270 B2
(45) Date of Patent: May 5, 2026

(54) HYBRID LDO REGULATOR INCLUDING ANALOG LDO REGULATOR AND DIGITAL LDO REGULATOR

(71) Applicant: SAMSUNG ELECTRONICS CO., LTD., Suwon-si (KR)

(72) Inventors: Jaehoon Lee, Suwon-si (KR); Yelim Youn, Suwon-si (KR); Yong Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 554 days.

(21) Appl. No.: 18/103,092

(22) Filed: Jan. 30, 2023

(65) Prior Publication Data

US 2023/0288948 A1 Sep. 14, 2023

(30) Foreign Application Priority Data

Mar. 10, 2022 (KR) ........................ 10-2022-0029895
Jun. 28, 2022 (KR) ........................ 10-2022-0079054

(51) Int. Cl.
*G05F 1/575* (2006.01)
*G05F 1/563* (2006.01)
*G05F 1/565* (2006.01)

(52) U.S. Cl.
CPC .............. *G05F 1/575* (2013.01); *G05F 1/563* (2013.01); *G05F 1/565* (2013.01)

(58) Field of Classification Search
CPC .......... G05F 1/575; G05F 1/563; G05F 1/565; G05F 1/573; G05F 1/56; G05F 1/59; G05F 1/595
See application file for complete search history.

(56) References Cited

U.S. PATENT DOCUMENTS

| | | | |
|---|---|---|---|
| 8,022,681 B2 | 9/2011 | Gurcan | |
| 10,126,766 B2 | 11/2018 | Cho et al. | |
| 10,649,479 B2 | 5/2020 | Heo et al. | |
| 10,845,831 B2 * | 11/2020 | Liu | G05F 1/563 |
| 2002/0070718 A1 | 6/2002 | Rose | |
| 2020/0042026 A1 | 2/2020 | Wang et al. | |

FOREIGN PATENT DOCUMENTS

| | | |
|---|---|---|
| CN | 109753099 A | 5/2019 |
| CN | 112068630 A | 12/2020 |

(Continued)

OTHER PUBLICATIONS

X. Ma, Y. Lu, Q. Li, W.-H. Ki and R. P. Martins, "An NMOS Digital LDO With NAND-Based Analog-Assisted Loop in 28-nm CMOS" (Year: 2020).*

(Continued)

*Primary Examiner* — Monica Lewis
(74) *Attorney, Agent, or Firm* — Sughrue Mion, PLLC

(57) ABSTRACT

A hybrid low drop-out (LDO) regulator is provided. The hybrid LDO regulator provides current to a load block, and includes: an analog LDO regulator configured to provide a first current corresponding to an average current consumed by the load block; and a digital LDO regulator configured to provide a second current corresponding to a peak current consumed by the load block based on information indicating the peak current is consumed.

20 Claims, 13 Drawing Sheets

(56) References Cited

FOREIGN PATENT DOCUMENTS

| | | | |
|---|---|---|---|
| EP | 3594773 | A1 | 1/2020 |
| KR | 102055501 | B1 | 12/2019 |

OTHER PUBLICATIONS

S. B. Nasir, S. Sen and A. Raychowdhury, "A 130nm hybrid low dropout regulator based on switched mode control for digital load circuits" (Year: 2016).*

S. B. Nasir and A. Raychowdhury, "Embedded hybrid LDO topologies for digital load circuits" (Year: 2016).*

Saad Bin Nasir et al., "Embedded Hybrid LDO topologies for Digital Load Circuits", 2016 IEEE Asia Pacific Conference on Circuits and Systems (APCCAS), Oct. 2016, pp. 43-46, DOI: 10.1109/APCCAS.2016.7803891, XP055772861.

Saad Bin Nasir et al., "A 130nm Hybrid Low Dropout Regulator based on Switched Mode Control for Digital Load Circuits", IEEE ESSCIRC Conference 2016: 42nd European Solid-State Circuits Conference, Sep. 2016, pp. 317-320, DOI: 10.1109/ESSCIRC.2016.7598306, XP032980872.

Communication issued on Jul. 19, 2023 by the European Patent Office in European Patent Application No. 23161276.3.

* cited by examiner

HYBRID LDO REGULATOR INCLUDING ANALOG LDO REGULATOR AND DIGITAL LDO REGULATOR

CROSS-REFERENCE TO RELATED APPLICATIONS

This application claims priority under 35 U.S.C. § 119 to Korean Patent Application No. 10-2022-0029895, filed on Mar. 10, 2022, and Korean Patent Application No. 10-2022-0079054, filed on Jun. 28, 2022, in the Korean Intellectual Property Office, the disclosures of which are incorporated by reference herein in their entireties.

BACKGROUND

The present disclosure relate to a low drop-out (LDO) regulator.

A voltage regulator is used to provide a uniform voltage to a circuit. The voltage regulator may be classified as a linear regulator and a switching regulator according to a voltage regulation method. The switching regulator has good efficiency, but has a disadvantage in that noise characteristics are poor. In contrast, the linear regulator has low efficiency but has an advantage in that noise characteristics are good. Because the linear regulator has good noise characteristics, it can supply a precise and stable voltage.

An LDO regulator is a type of linear regulator, and may be used to reliably supply power to various types of electronic devices. For example, the LDO regulator may be used in a power management integrated circuit (PMIC) of a mobile device such as a smart phone or a tablet PC.

Among the LDO regulators, an analog LDO regulator may be used. However, in the case of a related analog LDO regulator, the required current cannot be accurately supplied to a load block that consumes a spike current or a peak current, resulting in large fluctuations in the output voltage. Therefore, the related analog LDO regulator requires a large-capacity decoupling capacitor to reduce fluctuations in the output voltage, which is a major obstacle in designing the LDO regulator having a small size.

SUMMARY

Embodiments of the present disclosure provide a hybrid LDO regulator that can be implemented in a small area while minimizing the fluctuation of the output voltage.

According to an aspect of an example embodiment, a hybrid low drop-out (LDO) regulator provides current to a load block, and includes: an analog LDO regulator configured to provide a first current corresponding to an average current consumed by the load block; and a digital LDO regulator configured to provide a second current corresponding to a peak current consumed by the load block based on information indicating the peak current is consumed.

According to an aspect of an example embodiment, a hybrid LDO regulator includes: an analog LDO regulator configured to provide a first current corresponding to an average current consumed in a plurality of load blocks; and a digital LDO regulator configured to provide a second current corresponding to a peak current consumed by a load block, from among the plurality of load blocks, consuming the peak current based on information indicating the peak current is consumed.

According to an aspect of an example embodiment, an application processor includes at least one hybrid LDO regulator; and a power management integrated circuit configured to provide power to the application processor. The at least one hybrid LDO regulator includes: an analog LDO regulator configured to provide a first current corresponding to an average current consumed in a load block; and a digital LDO regulator configured to provide a second current corresponding to a peak current consumed by the load block based on information indicating the peak current is consumed.

BRIEF DESCRIPTION OF THE FIGURES

The above and other aspects and features of the present disclosure will be more clearly understood from the following description of example embodiments, taken in conjunction with the accompanying drawings, in which: embodiment.

DETAILED DESCRIPTION

Hereinafter, example embodiments will be described with reference to the accompanying drawings.

Figure 1:
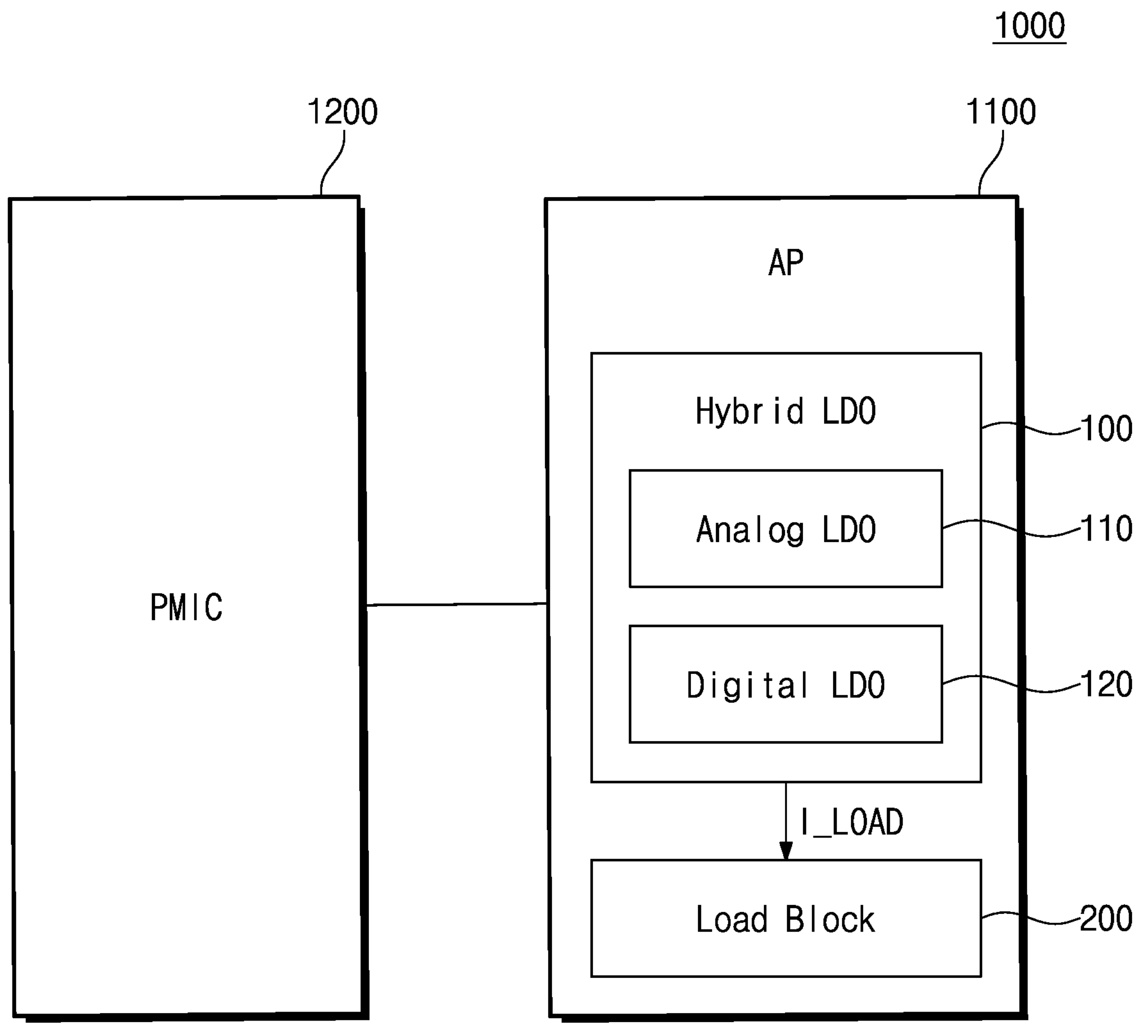
FIG. 1 is a block diagram illustrating a user device, according to an example

FIG. 1 is a block diagram illustrating a user device 1000, according to an example embodiment. Referring to FIG. 1, the user device 1000 includes an application processor (AP) 1100 and a power management integrated circuit (PMIC) 1200.

The application processor 1100 may be a processor used in a mobile device such as a smart phone, a tablet personal computer (PC), etc. The power management integrated circuit 1200 may provide a power supply voltage to the application processor 1100 through a power line.

The application processor 1100 may include various internal circuits. The application processor 1100 may include at least one LDO regulator to stably supply a current consumed by various internal circuits. For example, the application processor 1100 may include a hybrid LDO regulator 100 and a load block 200, and the hybrid LDO regulator 100 may provide a load current I_LOAD corresponding to the current consumed by the load block 200 to the load block 200.

In an example embodiment, the hybrid LDO regulator 100 may include an analog LDO regulator 110 and a digital LDO regulator 120. The analog LDO regulator 110 may provide a current corresponding to an average current consumed by the load block 200 to the load block 200. The digital LDO regulator 120 may receive information about a time during which a peak current is consumed by the load block 200. The digital LDO regulator 120 may receive the information from the load block 200. The digital LDO regulator 120 may provide a current corresponding to the peak current to the load block 200 during a time period the load block 200 is consuming the peak current.

The hybrid LDO regulator 100 according to an example embodiment may receive information about a time during which a peak current is consumed by the load block 200, and may provide a current corresponding to the peak current through the digital LDO regulator 120 to the load block 200 at the correct timing based on the information. Accordingly, fluctuations in an output voltage may be minimized. In addition, while an analog LDO regulator may provide a current corresponding to the peak current through a large-capacity decoupling capacitor, the hybrid LDO regulator 100 according to an example embodiment may provide a current corresponding to the peak current through the digital LDO regulator 120. Accordingly, the hybrid LDO regulator 100 according to an example embodiment may be implemented using a decoupling capacitor having a small capacity, and as a result, it can be manufactured in a small size.

Figure 2:
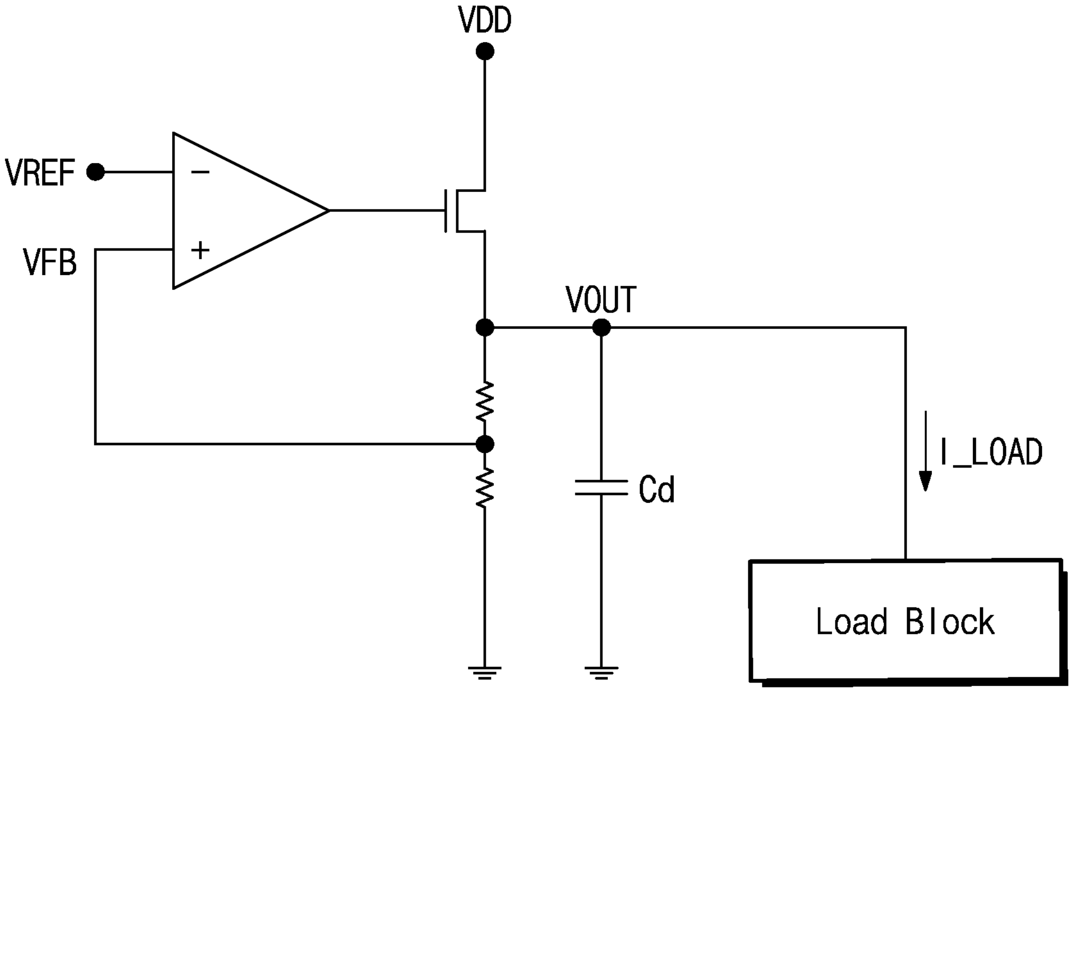
FIG. 2 is a diagram illustrating an analog LDO regulator.
Figure 3A:
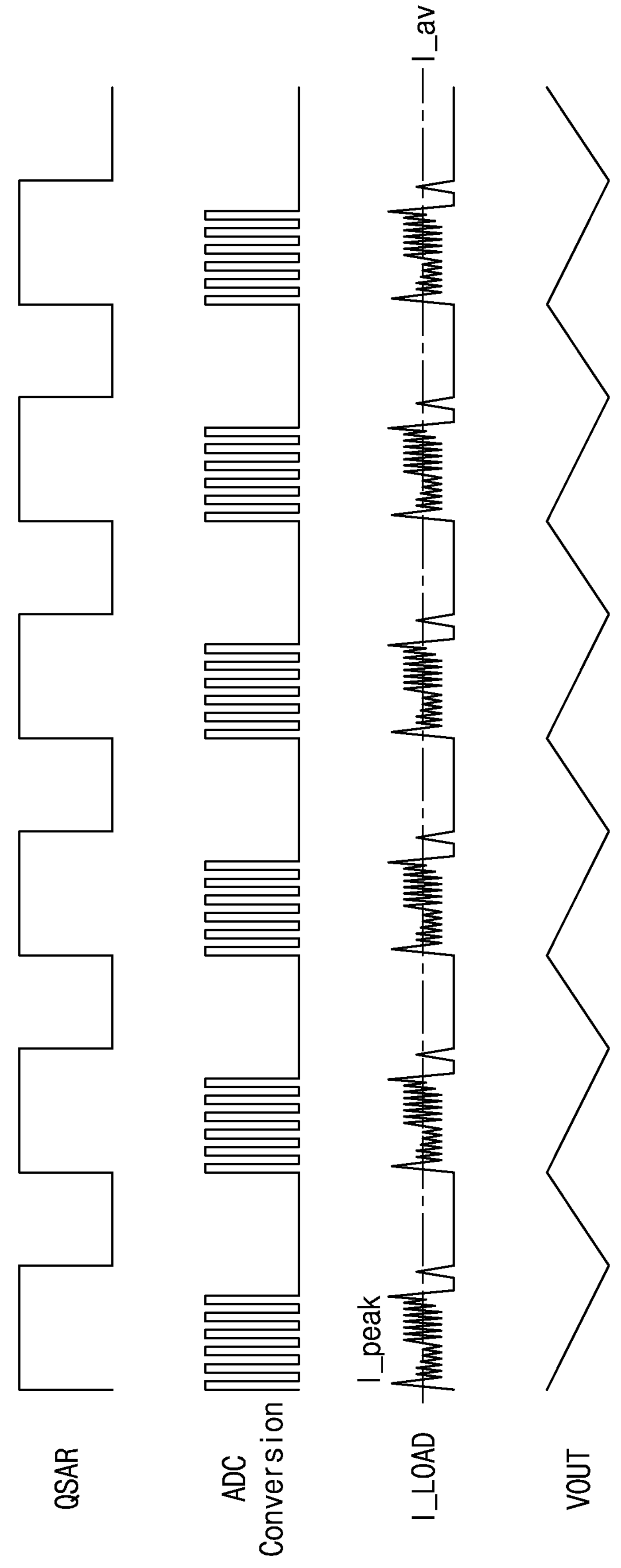
FIGS. 3A and 3B are diagrams for describing a fluctuation of an output voltage according to a sampling speed.
Figure 3B:
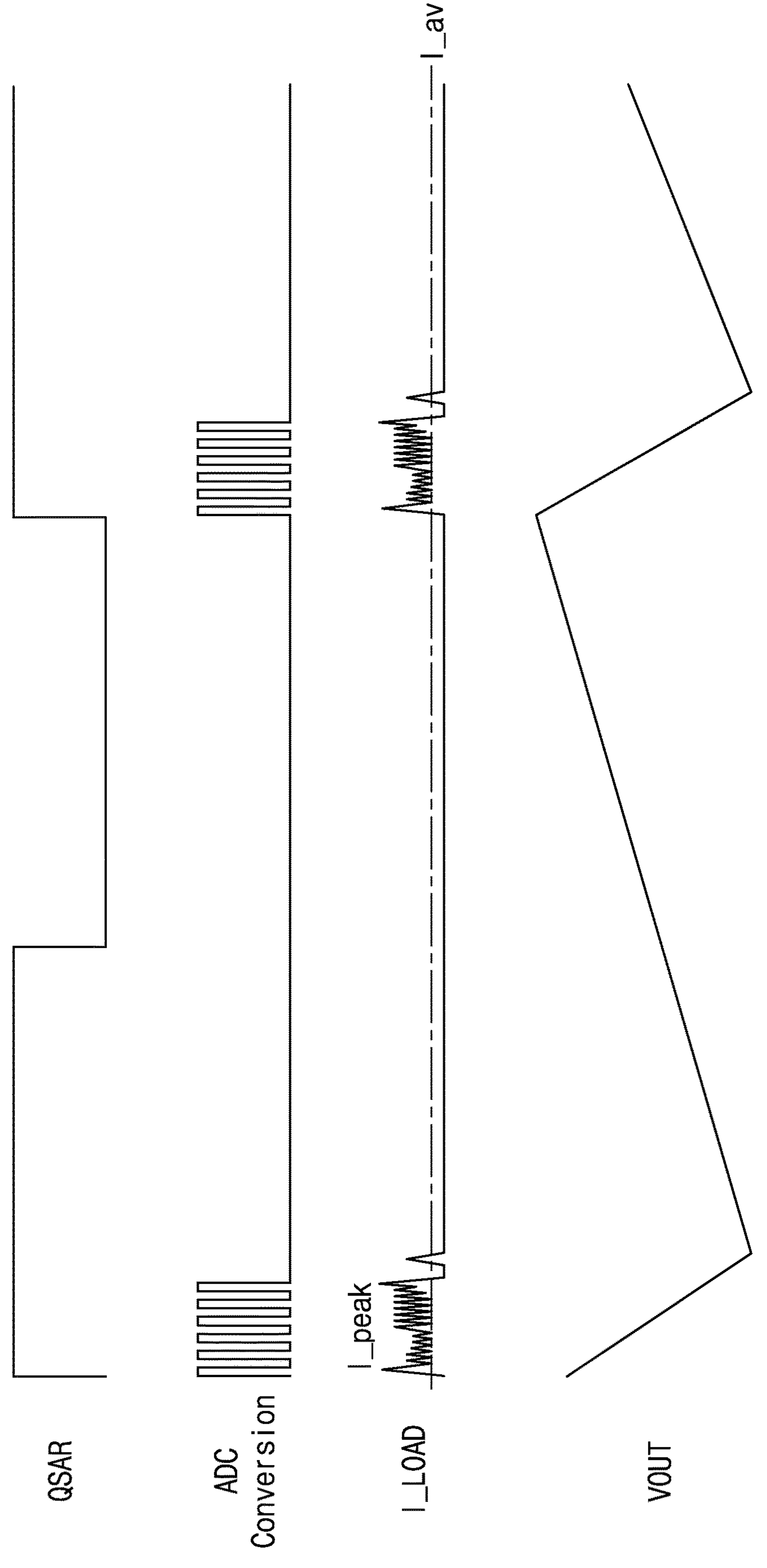

FIGS. 2, 3A and 3B are diagrams illustrating an example of a structure and operation of an LDO regulator. Specifically, FIG. 2 is a diagram illustrating an analog LDO regulator, and FIGS. 3A and 3B are diagrams for describing a fluctuation of an output voltage according to a sampling speed. For convenience of description, it is assumed that the load block is a SAR ADC (Successive-Approximation-Register ADC) block that supports an analog to digital conversion (ADC) function.

Referring to FIGS. 3A and 3B, the SAR ADC block operates in an asynchronous manner. As shown, the SAR ADC block may consume high-frequency peak current during the ADC operation, and little current during times other than the time to perform the ADC operation.

An analog LDO regulator may have a low feedback loop speed. Therefore, the analog LDO regulator may supply the average current consumed by the SAR ADC block, but may not supply the peak current required for the ADC operation. Therefore, in the case of the analog LDO regulator, a decoupling capacitor 'Cd' for providing a peak current may be additionally provided. In this case, to minimize the fluctuation of an output voltage VOUT, a capacitor have a large capacity is implemented as the decoupling capacitor Cd.

As will be described in more detail with reference to FIGS. 3A and 3B, the SAR ADC block may operate with a variable sampling speed, indicated by QSAR. For example, as illustrated in FIG. 3A, the SAR ADC block may operate at fast sampling speed, and as illustrated in FIG. 3B, the SAR ADC block may operate at a slow sampling speed.

As illustrated in FIGS. 3A and 3B, as the sampling speed of the SAR ADC block decreases, an average current I_av consumed by the SAR ADC block may decrease. However, regardless of the sampling speed of the SAR ADC block, the ADC operation inside the SAR ADC block is performed in the same way. Therefore, the SAR ADC block equally consumes a peak current I_peak both when operating at a slow sampling speed and when operating at a fast sampling speed. Accordingly, as the sampling speed is slower, a difference between the average current I_av and the peak current I_peak increases, and thus the fluctuation of the output voltage VOUT becomes excessively large.

Excessive fluctuations in the output voltage VOUT may degrade the performance of a load block such as the SAR ADC block. Therefore, a large capacity decoupling capacitor may be provided in an analog LDO regulator to reduce the excessive fluctuation of the output voltage VOUT. However, the large capacity decoupling capacitor results in an increase in the size of the load block such as the SAR ADC block.

Figure 4:
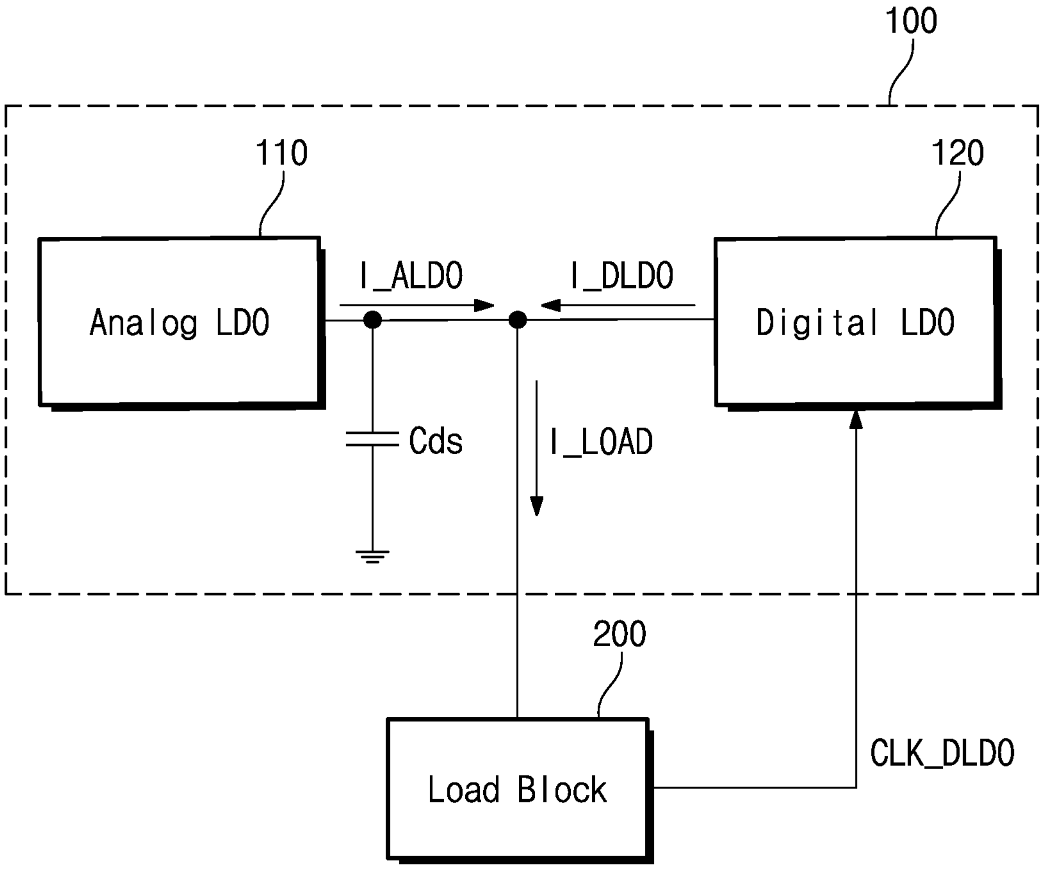
FIG. 4 is a block diagram illustrating a hybrid LDO regulator, according to an example embodiment.

FIG. 4 is a block diagram illustrating the hybrid LDO regulator 100 according to an example embodiment.

Referring to FIG. 4, the hybrid LDO regulator 100 includes the analog LDO regulator 110 and the digital LDO regulator 120.

The hybrid LDO regulator 100 may provide the load current I_LOAD corresponding to the current consumed by the load block 200. In detail, the analog LDO regulator 110 may provide a first current I_ALDO corresponding to an average current of a current consumed by the load block 200, and the digital LDO regulator 120 may provide a second current I_DLDO corresponding to a peak current of a current consumed by the load block 200.

In particular, the digital LDO regulator 120 receives information about a time during which the peak current is consumed by the load block 200, and may provide the second current I_DLDO corresponding to the peak current to the load block 200 during the time in which the peak current is consumed. For example, when the load block 200 is the SAR ADC block, the digital LDO regulator 120 may receive a clock signal CLK_DLDO associated with a conversion time (e.g., an ADC time) from the load block 200. The digital LDO regulator 120 may generate the second current I_DLDO corresponding to the peak current consumed in the ADC operation based on the received clock signal CLK_DLDO, and may accurately provide the second current I_DLDO during a time period during which the ADC operation is performed in the load block 200.

Figure 5:
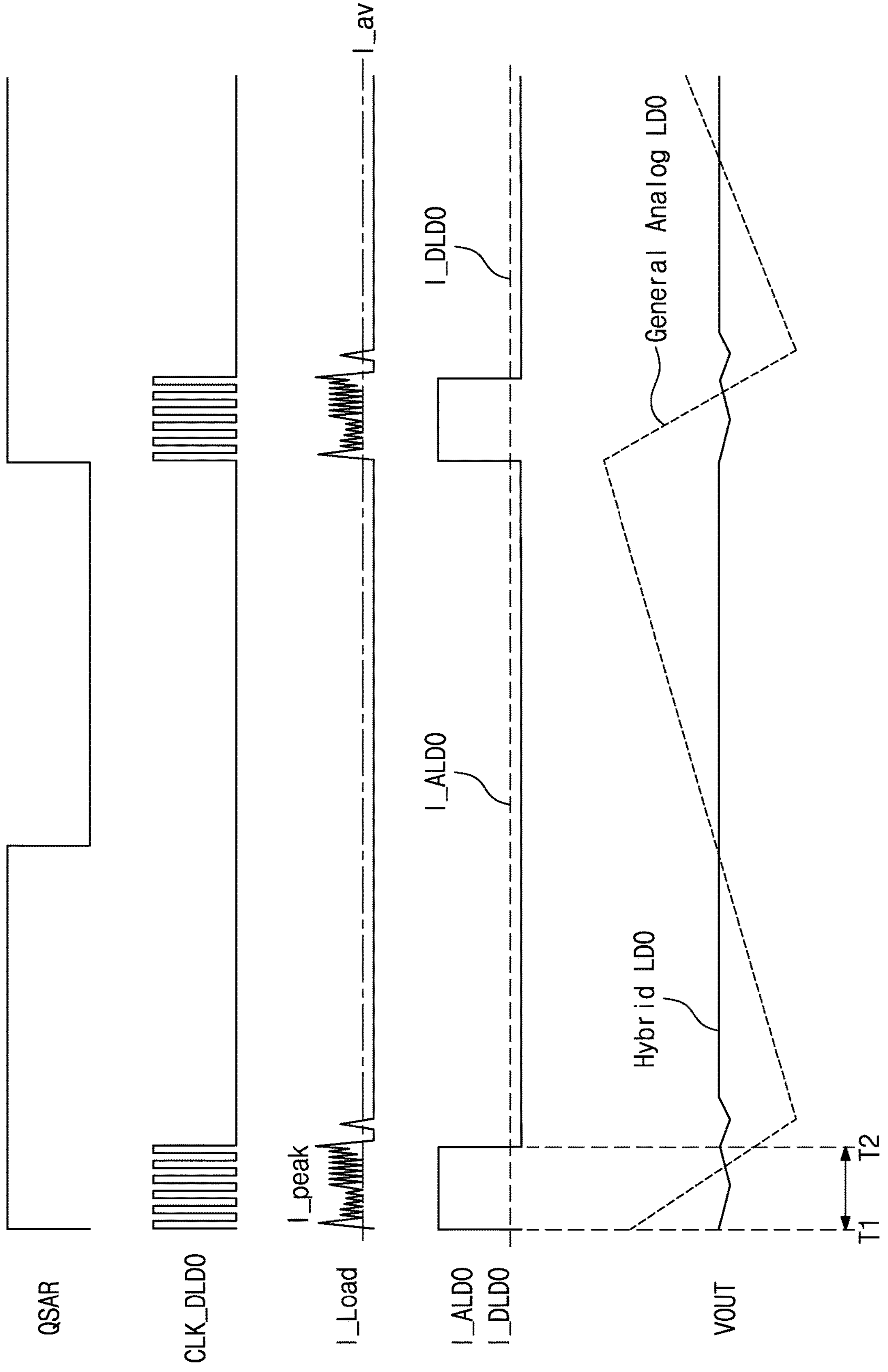
FIG. 5 is a diagram illustrating an example operation of a hybrid LDO regulator, according to an example embodiment.

FIG. 5 is a diagram illustrating an example of an operation of the hybrid LDO regulator 100 of FIG. 4. For convenience of description, it is assumed that the load block 200 is a SAR ADC block and operates at a slow sampling speed as illustrated in FIG. 3B. Also, it is assumed that the load block 200 performs an ADC operation between a time T1 and a time T2 at which the clock signal CLK_DLDO is toggled.

Referring to FIGS. 4 and 5, the first current I_ALDO corresponding to the average current I_av consumed by the load block 200 may be provided by the analog LDO regulator 110. The second current I_DLDO corresponding to the peak current I_peak consumed while the load block 200 performs the ADC operation may be provided by the digital LDO regulator 120. In other words, the digital LDO regulator 120 may provide the load block 200 with a current required for the ADC operation while the ADC operation is being performed.

Because the current required for ADC is provided by the digital LDO regulator 120, in the hybrid LDO regulator 100 according to the present disclosure, the fluctuation of the output voltage VOUT may be significantly reduced compared to the LDO regulator of FIG. 3B. In addition, because it is not necessary to provide a large-capacity capacitor to reduce the fluctuation of the output voltage VOUT, the hybrid LDO regulator 100 according to the present disclosure may be manufactured in a smaller size than the LDO regulator of FIG. 3B.

Figure 6:
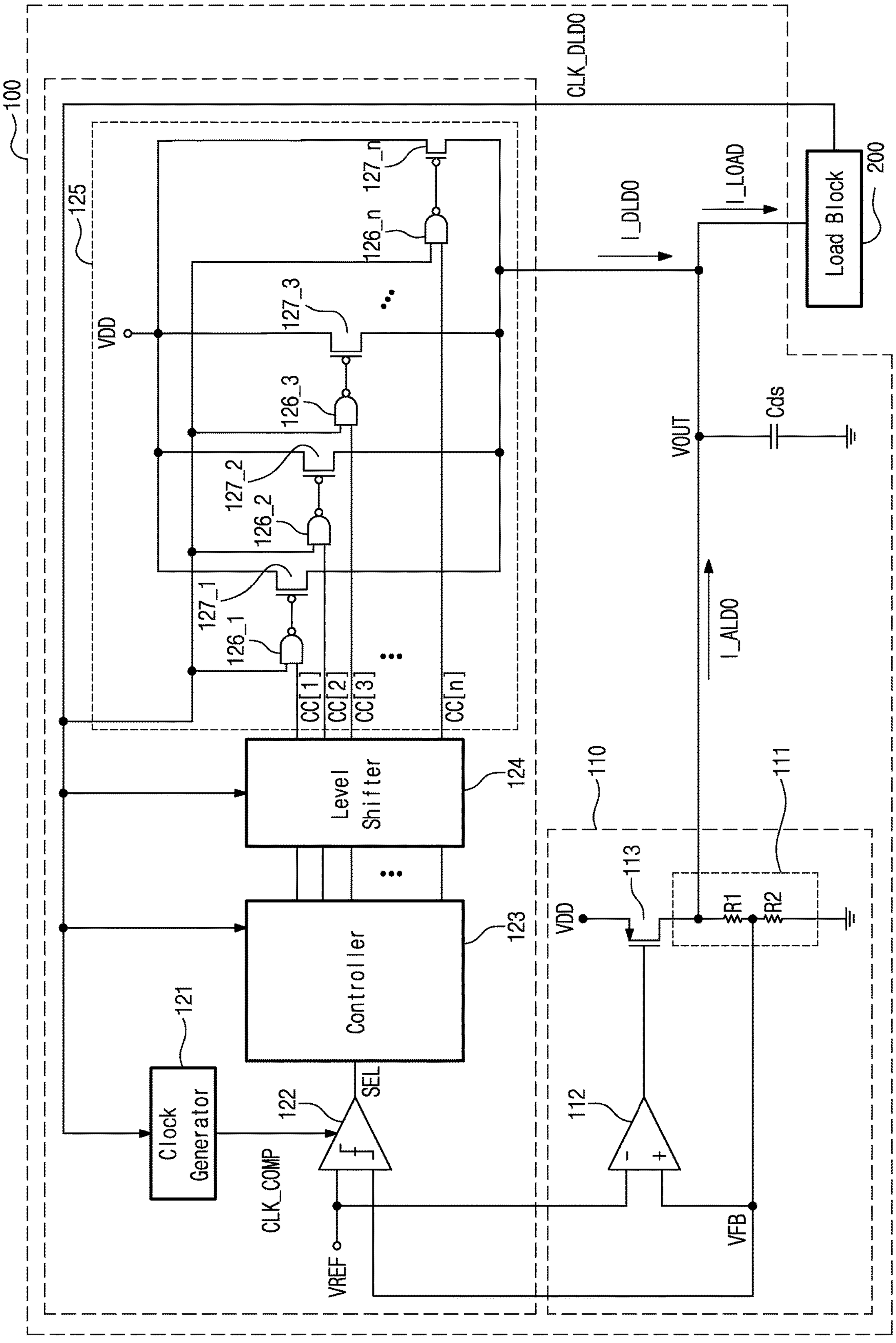
FIG. 6 is a circuit diagram illustrating a hybrid LDO regulator, according to an example embodiment.

FIG. 6 is a circuit diagram illustrating the hybrid LDO regulator 100, according to an example embodiment.

Referring to FIG. 6, the hybrid LDO regulator 100 may include the analog LDO regulator 110 and the digital LDO regulator 120. In addition, the hybrid LDO regulator 100 may further include a decoupling capacitor Cds having a smaller capacitance than that of the decoupling capacitor Cd of FIG. 2.

The analog LDO regulator 110 provides the first current I_ALDO corresponding to an average current of a current consumed by the load block 200. To this end, the analog LDO regulator 110 may include a voltage divider 111, an amplifier 112, and a pass transistor 113.

The voltage divider 111 receives the output voltage VOUT, and divides the received output voltage VOUT to generate a feedback voltage VFB. The feedback voltage VFB generated by the voltage divider 111 may be provided to the amplifier 112.

The feedback voltage VFB is provided to a positive input terminal of the amplifier 112, and a reference voltage VREF is provided to a negative input terminal of the amplifier 112. An output terminal of the amplifier 112 is connected to a gate of the pass transistor 113.

The pass transistor 113 is connected between a terminal of a power supply voltage VDD and the voltage divider 111. The pass transistor 113 connects or blocks a channel based on a voltage level of the output terminal of the amplifier 112.

In more detail, when the output voltage VOUT decreases, the feedback voltage VFB divided by the voltage divider 111 also decreases. In this case, a voltage level of the feedback voltage VFB may be lower than that of the reference voltage VREF, and accordingly, the output voltage of the amplifier 112 is also lowered. Accordingly, the channel of the pass transistor 113 is connected, and the first current I_ALDO is provided from the terminal of the power supply voltage VDD to the load block 200. In this way, the analog LDO regulator 110 may provide the first current I_ALDO corresponding to the average current consumed by the load block 200 to the load block 200.

Continuing to refer to FIG. 6, the digital LDO regulator 120 receives information about a time during which a peak current is consumed by the load block 200. For example, the digital LDO regulator 120 receives a first clock signal CLK_DLDO from the load block 200, and the first clock signal CLK_DLDO may toggle to indicate the ADC operation or similar operation that consumes a peak current.

The digital LDO regulator 120 may generate the second current I_DLDO corresponding to the peak current when the first clock signal CLK_DLDO toggles (i.e., while the load block 200 consumes the peak current), and may provide the second current I_DLDO to the load block 200. To this end, the digital LDO regulator 120 may include a clock generator 121, a comparator 122, a controller 123, a level shifter 124, and a pass transistor array 125.

The clock generator 121 receives the first clock signal CLK_DLDO which toggles during a time in which the peak current is consumed by the load block 200. The clock generator 121 generates a second clock signal CLK_COMP based on the first clock signal CLK_DLDO and provides the generated second clock signal CLK_COMP to the comparator 122.

The comparator 122 operates in synchronization with the second clock signal CLK_COMP. The comparator 122 compares the feedback voltage VFB and the reference voltage VREF, and provides the comparison result to the controller 123. For example, when the feedback voltage VFB is less than the reference voltage VREF, the comparator 122 may provide a selection signal SEL having a low level to the controller 123. When the feedback voltage VFB is greater than the reference voltage VREF, the comparator 122 may provide the selection signal SEL having a high level to the controller 123.

The controller 123 determines a number of pass transistors to be turned on based on a comparison result between the feedback voltage VFB and the reference voltage VREF. For example, when the feedback voltage VFB is greater than the reference voltage VREF, the controller 123 may control the level shifter 124 to increase the number of pass transistors that are turned on. Accordingly, the amount of the second current I_DLDO provided to the output voltage terminal may increase. In contrast, when the feedback voltage VFB is less than the reference voltage VREF, the controller 123 may control the level shifter 124 to decrease the number of pass transistors that are turned on. As the number of pass transistors that are turned on increases, the second current I_DLDO increases. Accordingly, the amount of the second current I_DLDO provided to the output voltage terminal may decrease.

In an example embodiment, the controller 123 may control the level shifter 124 to sequentially increase or decrease the number of pass transistors that are turned on. For example, the controller 123 may control the level shifter 124 to turn on or turn off one pass transistor at a time.

In an example embodiment, the controller 123 may control one or more search operations to identify a number of pass transistors to be turned on. In an example embodiment, the controller 123 may support a coarse search operation and a fine search operation to reduce a settling time. In this case, the controller 123 may control the level shifter 124 such that the number of pass transistors that are additionally turned on at one time during the coarse search period is greater than the number of pass transistors that are additionally turned on at one time during the fine search period. For example, at least two pass transistors may be additionally turned on at a time during the coarse search period, and one pass transistor may be turned on at a time during the fine search period.

In an example embodiment, the controller 123 may support a stuck function to reduce a ripple of the output voltage VOUT. For example, when the selection signal SEL received from the comparator 122 repeats a high level and a low level, the controller 123 may control the level shifter 124 such that the number of pass transistors that are turned on is fixed without being changed any more.

The level shifter 124 may operate in synchronization with the first clock signal CLK_DLDO associated with a time during which the peak current is consumed. The level shifter 124 may output a control code CC under the control of the controller 123. For example, the level shifter 124 may be a 64-bit level shifter, and in this case, the level shifter 124 may output a 64-bit control code CC[64:1].

The pass transistor array 125 may operate in synchronization with the first clock signal CLK_DLDO associated with the time during which the peak current is consumed. The pass transistor array 125 may receive the control code CC from the level shifter 124, and may generate the second current I_DLDO provided to the output voltage terminal or may control the amount of the second current I_DLDO, in response to the control code CC. The pass transistor array 125 includes a plurality of NAND gates 126_1 to **126_*n* and a plurality of pass transistors 127_1 to 127_*n***, and one NAND gate may correspond to one pass transistor.

In more detail, each of the plurality of NAND gates 126_1 to **126_*n* may receive the first clock signal CLK_DLDO. Also, each of the plurality of NAND gates 126_1 to 126_*n* may receive the corresponding control code CC. Each of the plurality of NAND gates 126_1 to 126_*n* may output a high-level signal or a low-level signal based on the first clock signal CLK_DLDO and the corresponding control code CC, and may provide the output signal to a gate of the corresponding pass transistor among the plurality of pass transistors 127_1 to 127_*n*. The plurality of pass transistors 127_1 to 127_*n*** are connected between the terminal of the power supply voltage VDD and an output voltage terminal, and may be turned on or off depending on the output of the corresponding NAND gate.

For example, the first NAND gate 126_1 may receive the first clock signal CLK_DLDO and the first control code CC[1]. When both the first clock signal CLK_DLDO and the first control code CC[1] are at a high level, the first NAND gate 126_1 may provide a low level signal to the gate of the first pass transistor 127_1. In this case, the first pass transistor 127_1 is turned on, and accordingly, the second current I_DLDO may be provided to the output voltage terminal.

As in the above description, the second NAND gate 126_2 may receive the first clock signal CLK_DLDO and the second control code CC[2]. When both the first clock signal CLK_DLDO and the second control code CC[2] are at a high level, the second NAND gate 126_2 may provide a low level signal to the gate of the second pass transistor 127_2. In this case, the second pass transistor 127_2 is additionally turned on, and accordingly, the amount of the second current I_DLDO provided to the output voltage terminal may increase.

In this way, the second current I_DLDO corresponding to the peak current may be generated and provided during a time during which the peak current is consumed in the load block 200, and the amount of the second current I_DLDO may be adjusted to exactly correspond to the peak current.

Figure 7:
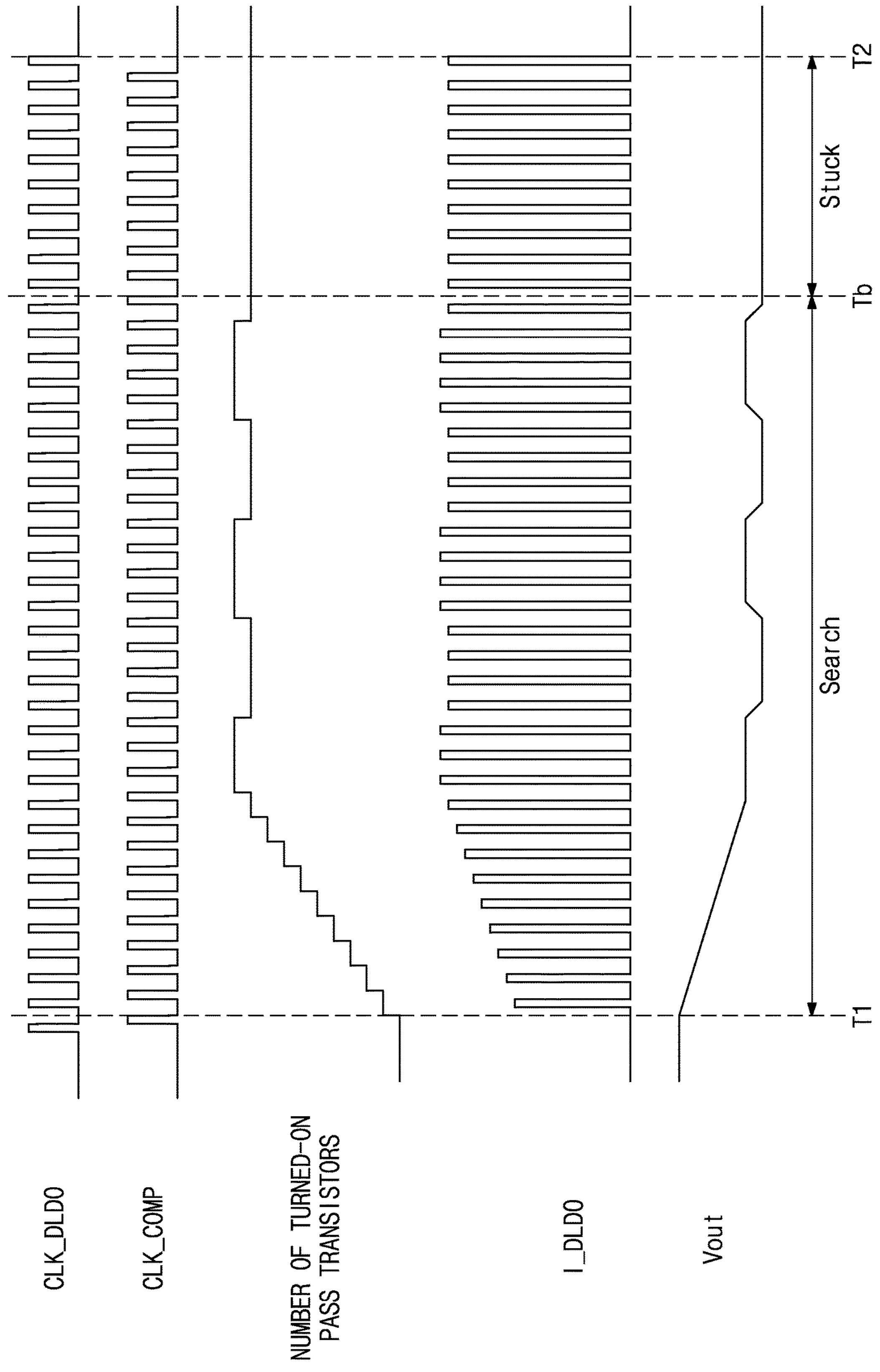
FIG. 7 is a timing diagram illustrating operation of a digital LDO regulator, according to an example embodiment.

FIG. 7 is a timing diagram illustrating an example of an operation of the digital LDO regulator 120 of FIG. 6. For convenience of description, it is assumed that the digital LDO regulator 120 provides the second current I_DLDO corresponding to the peak current between the time T1 and the time T2. It is also assumed that the digital LDO regulator 120 supports a stuck function.

Referring to FIGS. 6 and 7, the first clock signal CLK_DLDO including information about a time during which a peak current is consumed is received from the load block 200. For example, the peak current is consumed by the load block 200 during the time from the time T1 to the time T2, and the first clock signal CLK_DLDO may be toggled during the time T1 to the time T2.

The clock generator 121 may identify the first clock signal CLK_DLDO is toggled and may generate the second clock signal CLK_COMP based on the received first clock signal CLK_DLDO. The comparator 122 operates in synchronization with the second clock signal CLK_COMP and compares the feedback voltage VFB with the reference voltage VREF.

At the time T1 when the first clock signal CLK_DLDO is first toggled, the second current I_DLDO may not yet be provided to the output voltage terminal. In this case, the feedback voltage VFB may be greater than the reference voltage VREF, and the comparator 122 may provide the selection signal SEL having a high level to the controller 123.

The controller 123 controls the level shifter 124 to turn on the first pass transistor 127_1 based on the selection signal SEL of the high level. The level shifter 124 may output '1' as the first control code CC[1] and may output '0' as the remaining control codes.

The first NAND gate 126_1 may receive the first clock signal CLK_DLDO and the first control code CC[1] having a value of '1'. Accordingly, the first NAND gate 126_1 provides a low-level signal to the gate of the first pass transistor 127_1, and accordingly, the first pass transistor 127_1 is turned on. Accordingly, the second current I_DLDO will be generated and provided to the output voltage terminal. The second to n-th NAND gates 126_2 to **126_*n* may receive the first clock signal CLK_DLDO and control codes having a value of '0', and accordingly, the second to n-th pass transistors 127_2 to 127_*n*** will be turned off.

Thereafter, the comparator 122 compares the feedback voltage VFB and the reference voltage VREF again. Because the amount of the second current I_DLDO has not yet reached a sufficient amount for the peak current, the feedback voltage VFB may be greater than the reference voltage VREF. In this case, the comparator 122 may provide the selection signal SEL of a high level to the controller 123, and the level shifter 124 will output '1' as the first and second control codes CC[1] and CC[2], '0' as the remaining control codes, in response to the control of the controller 123. Accordingly, the first and second pass transistors 127_1 and 127_2 are turned on, and the amount of the second current I_DLDO increases.

In this way, the number of pass transistors that are turned on may increase by one each time the first clock signal CLK_DLDO toggles until the optimal amount of the second current I_DLDO corresponding to the peak current has been found. In this case, a period in which the number of pass transistors turned on to find an optimal amount of the second current I_DLDO varies may be defined as a search period.

When the selection signal SEL received from the comparator 122 repeats a high level and a low level, the controller 123 may determine that an optimal amount of the second current I_DLDO is found. In this case, the controller 123 may control the level shifter 124 to stop changing the number of pass transistors that are turned on, and in this regard the number of pass transistors that are turned on may be fixed. In this case, a period in which the number of pass transistors that are turned on is fixed may be defined as a stuck period. Accordingly, the output voltage VOUT may be stably provided without a ripple.

As described above, the digital LDO regulator 120 according to an example embodiment may receive information about the time during which a peak current is consumed by the load block 200 and may provide a current corresponding to the peak current at an accurate timing to the load block 200. Accordingly, the fluctuation of the output voltage terminal may be minimized. In addition, by providing a current corresponding to the peak current through the digital LDO regulator 120, the hybrid LDO regulator 100 according to an example embodiment may be implemented even using a small capacity decoupling capacitor. As a result, the hybrid LDO regulator 100 according to the example embodiment may be manufactured to have a small size and provide an output voltage with minimal fluctuation.

Figure 8:
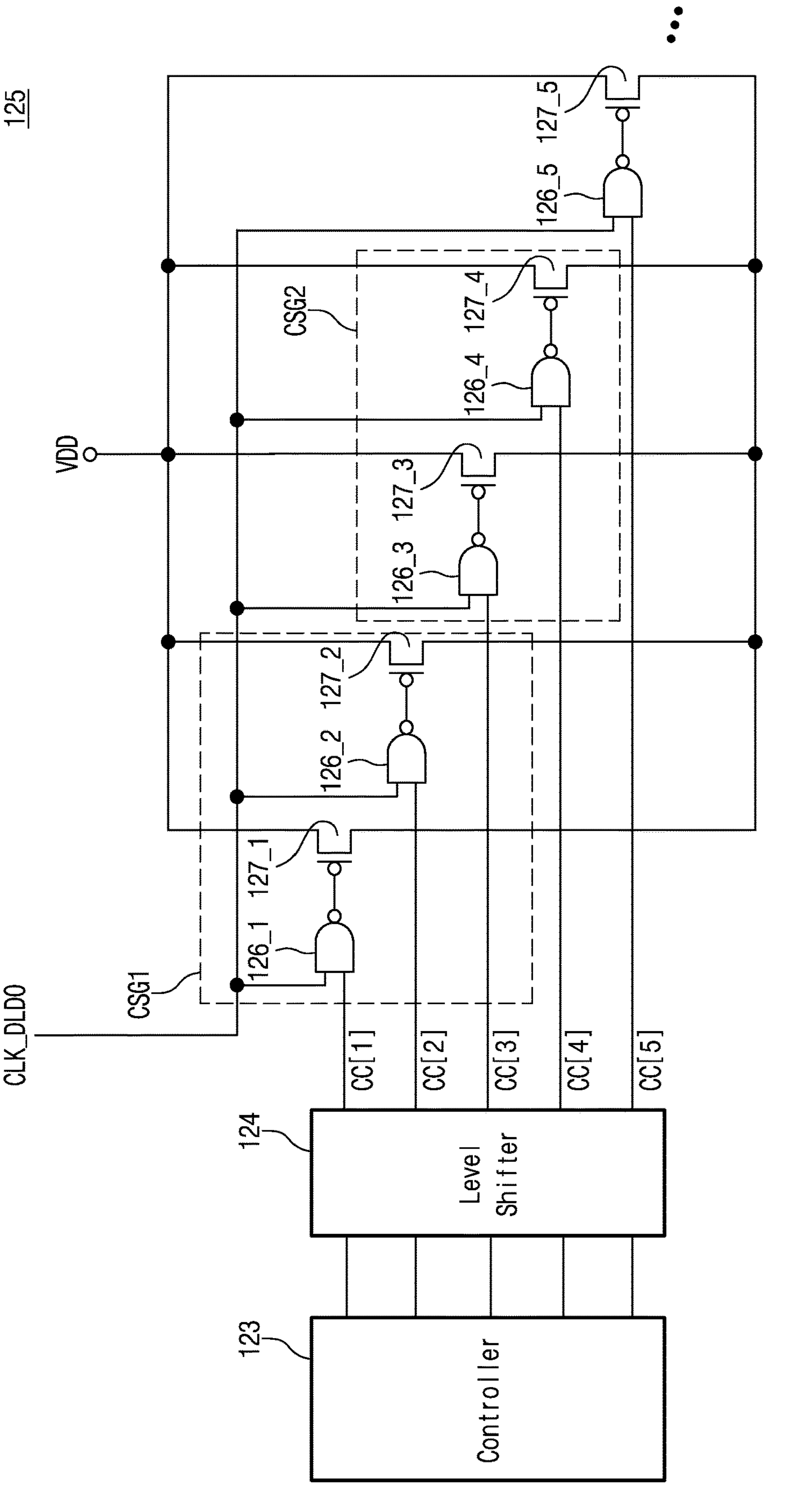
FIG. 8 is a diagram illustrating a pass transistor array of a digital LDO regulator supporting coarse search and fine search operations, according to an example embodiment.
Figure 9:
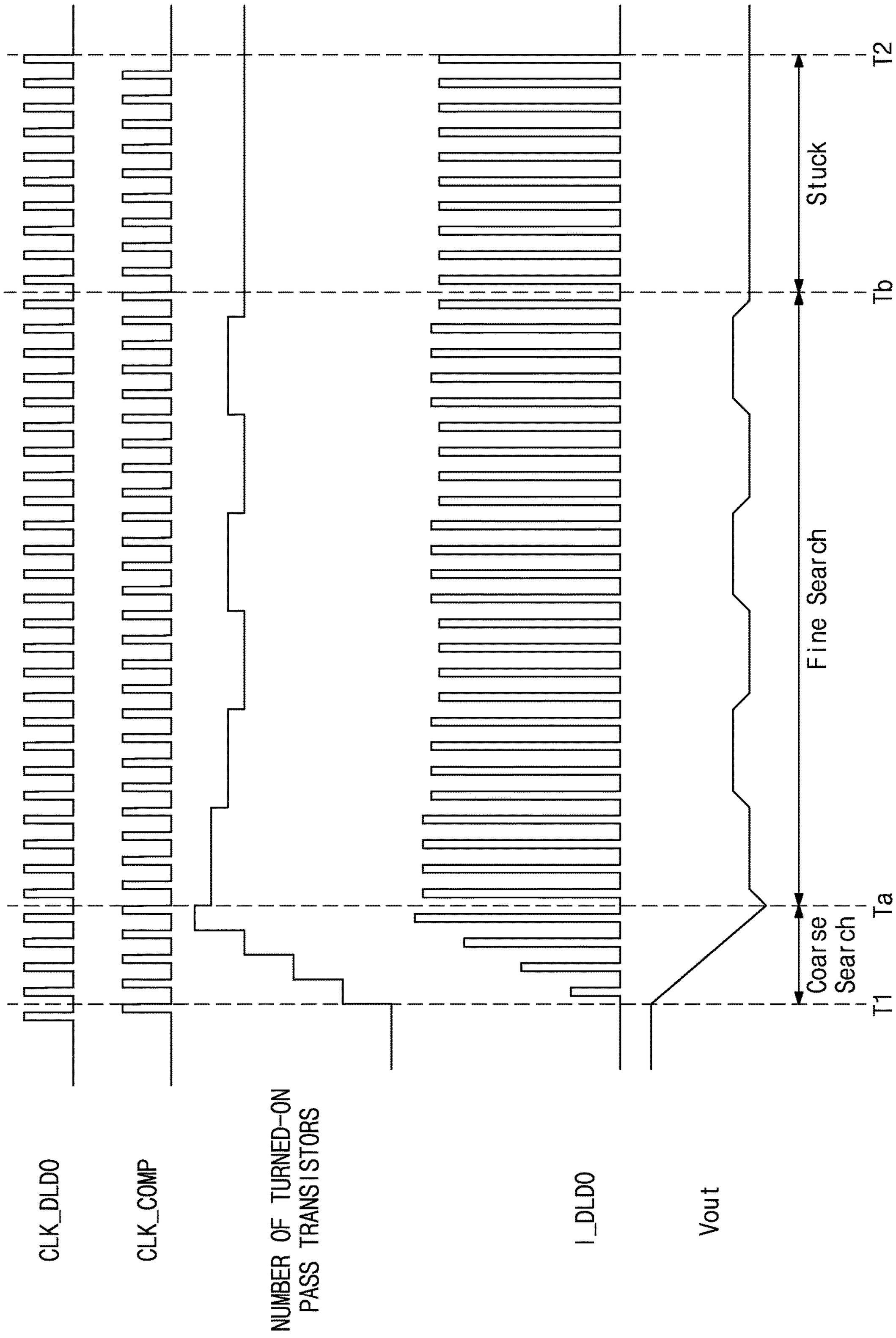
FIG. 9 is a timing diagram illustrating coarse search and fine search operations, according to an example embodiment.

FIGS. 8 and 9 are diagrams illustrating another example of an operation of the digital LDO regulator 120 of FIG. 6. In detail, FIG. 8 is a diagram illustrating the pass transistor array 125 of the digital LDO regulator 120 supporting coarse search and fine search operations, and FIG. 9 is a timing diagram illustrating an example of the coarse search and fine search operations. The configuration and operation of the digital LDO regulator to be described with reference to FIGS. 8 and 9 are similar to the configuration and operation of the digital LDO regulator described with reference to FIGS. 6 and 7. Therefore, for the sake of brevity, repeated descriptions will be omitted to avoid redundancy.

The digital LDO regulator 120 according to an example embodiment may support a coarse search operation and a fine search operation to reduce a settling time. In this case, the controller 123 may control the level shifter 124 to output control codes such that the number of pass transistors that are turned on at one time in the coarse search period is greater than the number of pass transistors that are turned on at one time in the fine search period.

For example, as illustrated in FIG. 8, the controller 123 may set the two pass transistors 127_1 and 127_2 and the NAND gates 126_1 and 126_2 corresponding thereto to a first coarse search group CSG1, and may set subsequent two pass transistors 127_3 and 127_4 and the NAND gates 126_3 and 126_4 corresponding thereto to a second coarse search group CSG2. In this way, the controller 123 may set each of a plurality of coarse search groups such that two NAND gates and two pass transistors are included in each coarse search group. In this case, the pass transistors included in each coarse search group are turned on at once in synchronization with the first clock signal CLK_DLDO, and accordingly, the amount of the second current I_DLDO may increase more than when one pass transistor is turned on. As a result, the optimal amount of the second current I_DLDO corresponding to the peak current may be found more quickly.

As described in more detail with reference to FIGS. 8 and 9, when the first clock signal CLK_DLDO starts to be toggled, the digital LDO regulator 120 may perform the coarse search operation. In detail, the controller 123 may receive the selection signal SEL of a high level, and based on this, the controller 123 may control the level shifter 124 to turn on the pass transistors included in the first coarse search group CSG1 at once. For example, it is assumed that each coarse search group includes two pass transistors. In this case, the level shifter 124 may output '1' as the first and second control codes CC[1] and CC[2], and may output '0' as the remaining control codes. Accordingly, at the time T1, the first and second pass transistors 127_1 and 127_2 are turned on at once, and the second current I_DLDO is generated and provided to the output voltage terminal.

Thereafter, when the feedback voltage VFB is still greater than the reference voltage VREF, the controller 123 may receive the selection signal SEL of a high level, and control the level shifter 124 to additionally turn on the pass transistors included in the second coarse search group CSG2. In this case, the level shifter 124 may output '1' as the first to fourth control codes CC[1] to CC[4], and may output '0' as the remaining control codes. Accordingly, the two pass transistors 127_3 and 127_4 may be additionally turned on. In this way, the controller 123 may repeatedly perform the coarse search operation until the feedback voltage VFB becomes lower than the reference voltage VREF.

When the feedback voltage VFB becomes lower than the reference voltage VREF at a time Ta, the digital LDO regulator 120 may complete the coarse search operation and may start the fine search operation. In detail, the controller 123 may receive the selection signal SEL of a low level, and may control the level shifter 124 to turn off one of the pass transistors turned on in the coarse search operation of the previous stage. For example, when the first to eighth pass transistors 127_1 to 127_8 are turned on in the coarse search operation of the previous stage, the controller 123 may control the level shifter 124 to turn on only the first to seventh pass transistors 127_1 to 127_7.

Thereafter, when the feedback voltage VFB is still lower than the reference voltage VREF, the controller 123 may control the level shifter 124 to additionally turn off another one of the pass transistors turned on in the previous stage. In this way, the optimal amount of the second current I_DLDO corresponding to the peak current may be found.

As described above, the digital LDO regulator 120 according to an example embodiment may provide the second current I_DLDO corresponding to the peak current consumed by the load block more quickly by supporting the coarse search operation and the fine search operation.

In FIGS. 8 and 9, it has been described that the coarse search operation is performed until the comparison result between the feedback voltage VFB and the reference voltage VREF is inverted. However, this is only an example, and the coarse search operation may be performed only a predetermined number of times.

Figure 10:
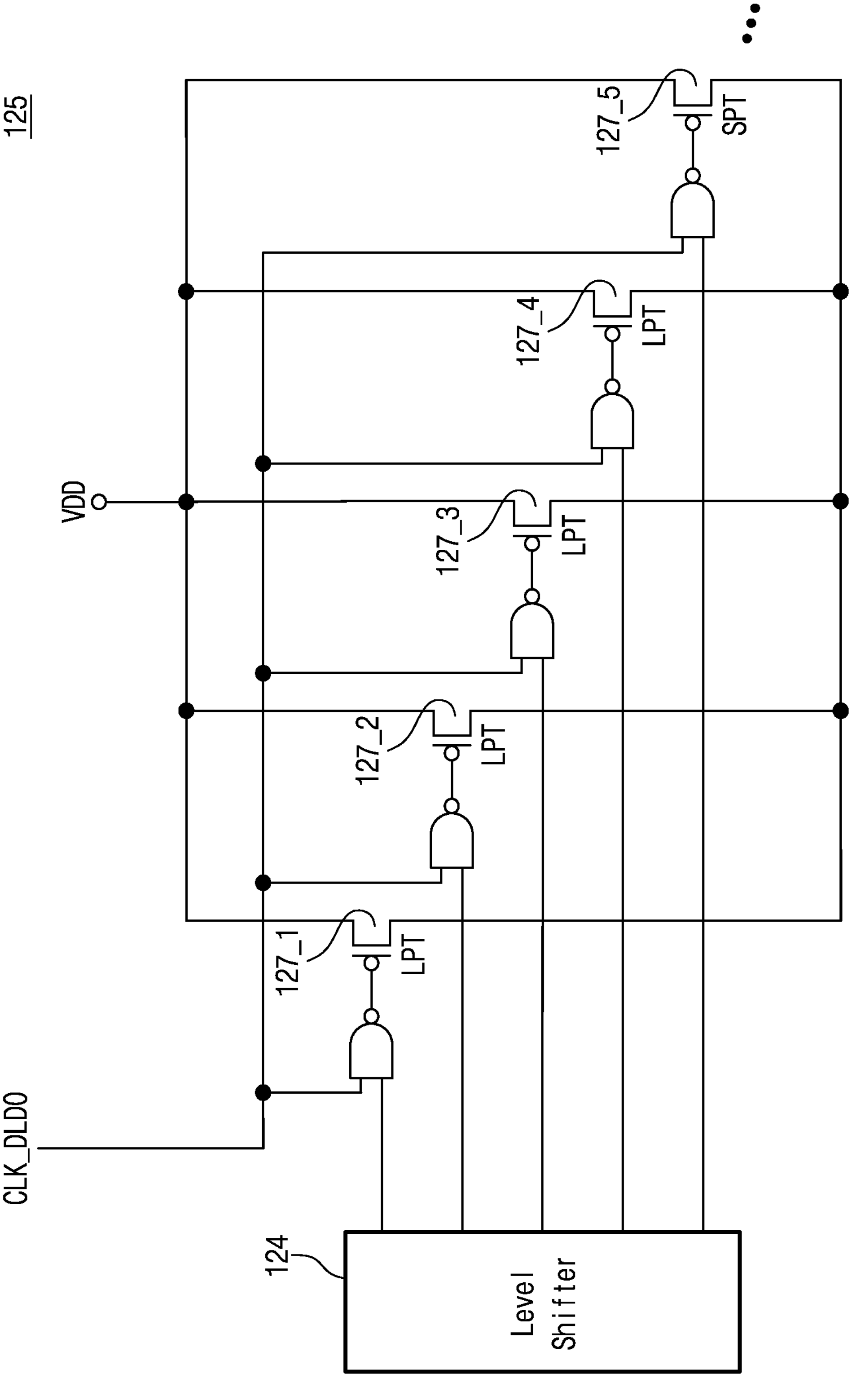
FIG. 10 is a diagram illustrating a digital LDO regulator, according to an example embodiment.

FIG. 10 is a diagram illustrating another example of the digital LDO regulator 120 of FIG. 6. The configuration and operation of the digital LDO regulator to be described with reference to FIG. 10 are similar to the configuration and operation of the digital LDO regulator described with reference to FIGS. 8 and 9. Therefore, for the sake of brevity, repeated descriptions will be omitted to avoid redundancy.

To support the coarse search operation and the fine search operation, the digital LDO regulator of FIGS. 8 and 9 sets at least two pass transistors and the two NAND gates corresponding thereto to one coarse search group. However, the present disclosure is not limited thereto. As another example, as illustrated in FIG. 10, by implementing the pass transistors to have different sizes, the digital LDO regulator may also perform the coarse search operation and the fine search operation.

For example, referring to FIG. 10, the pass transistors performing the coarse search operation may be implemented with large power transistors (LPTs). In this case, the large power transistor LPT means a transistor having a large size. Because the large power transistor LPT has a large current supply amount, the amount of the second current I_DLDO may be largely adjusted.

In contrast, the pass transistors performing the fine search operation may be implemented with small power transistors (SPTs). In this case, the small power transistor SPT means a transistor having a small size. Because the small power transistor SPT has a small current supply amount, the amount of the second current I_DLDO may be finely adjusted.

For example, when the digital LDO regulator is designed to perform the fine search operation after consecutively performing the coarse search operation four times, the first to fourth pass transistors 127_1 to 127_4 may be implemented using the large power transistor LPT, and other pass transistors may be implemented using the small power transistor SPT.

Figure 11:
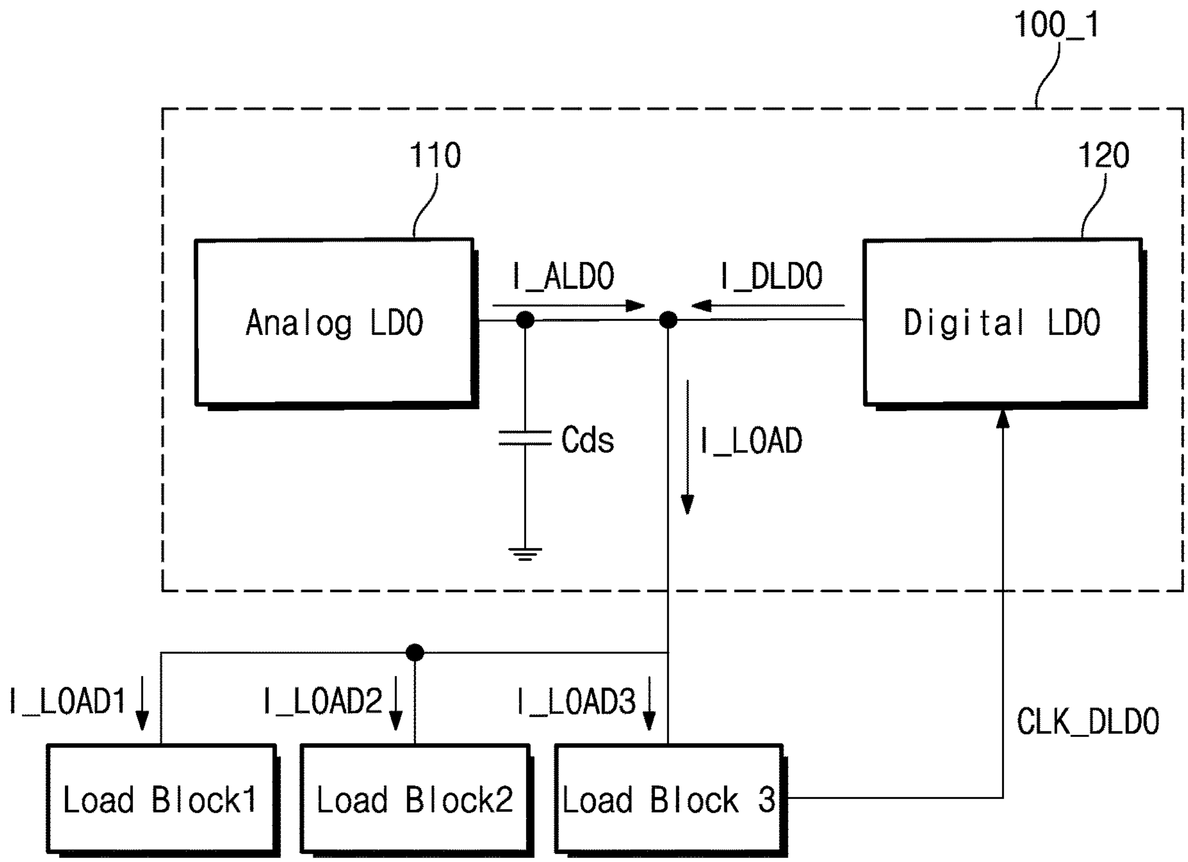
FIGS. 11 and 12 are block diagrams illustrating a hybrid LDO regulator according to an example embodiment.
Figure 12:
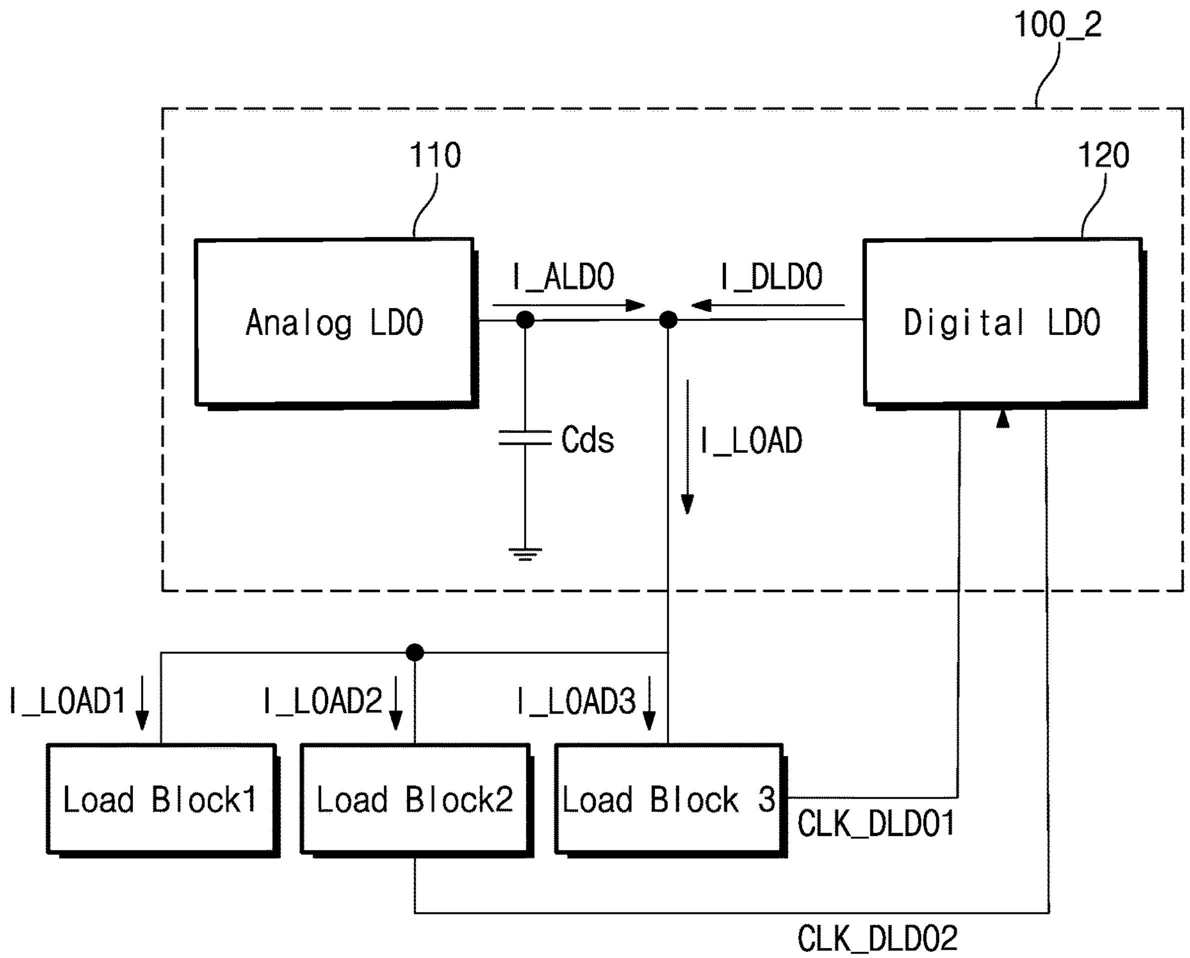

FIGS. 11 and 12 are block diagrams illustrating hybrid LDO regulators 100_1 and 100_2 according to an example embodiment. The hybrid LDO regulator 100_1 of FIGS. 11 and 12 is similar to the hybrid LDO regulator 100 of FIG. 4. Therefore, for the sake of brevity, repeated descriptions will be omitted to avoid redundancy.

Referring to FIG. 11, the hybrid LDO regulator 100_1 may provide the load current I_LOAD corresponding to the current consumed by a plurality of load blocks Load Block1, Load Block2, and Load Block3. For example, when a peak current is consumed in one load block Load Block3 among the plurality of load blocks Load Block1, Load Block2, and Load Block3, the analog LDO regulator 110 may provide the first current I_ALDO corresponding to the average current consumed by the plurality of load blocks Load Block1, Load Block2, and Load Block3, and the digital LDO regulator 120 may provide the second current I_DLDO required for the third load block Load Block3 consuming the peak current among the plurality of load blocks Load Block1, Load Block2, and Load Block3.

In addition, as illustrated in FIG. 12, when a peak current is consumed in two load blocks Load Block2 and Load Block3 among the plurality of load blocks Load Block1, Load Block2, and Load Block3, the analog LDO regulator 110 may provide the first current I_ALDO corresponding to the average current consumed by the plurality of load blocks Load Block1, Load Block2, and Load Block3, and the digital LDO regulator 120 may provide the second current I_DLDO required for the second and third load blocks Load Block2 and Load Block3 consuming the peak current among the plurality of load blocks Load Block1, Load Block2, and Load Block3.

As such, when the plurality of load blocks share one hybrid LDO regulator, the hybrid LDO regulator according to an example embodiment may receive operation information of each load block requiring a peak current, and based on this, may accurately provide a current corresponding to the peak current during a time during which the peak current is consumed. Accordingly, the capacity of the decoupling capacitor Cds may be minimized, and each load block may also operate at an optimal speed.

According to an example embodiment, the hybrid LDO regulator can be implemented in a small area while minimizing the fluctuation of the output voltage.

In some embodiments, each of the components represented by a block as illustrated in FIGS. 1, 2, 4, 6, 8 and 10-12 may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A hybrid low drop-out (LDO) regulator which provides current to a load block, comprising:

an analog LDO regulator configured to provide a first current corresponding to an average current consumed by the load block; and a digital LDO regulator configured to provide a second current corresponding to a peak current consumed by the load block based on information received from the load block indicating the peak current is consumed.

2. The hybrid LDO regulator of claim 1, wherein the digital LDO regulator comprises:

a pass transistor array comprising a plurality of pass transistors; and a controller configured to control at least one of the plurality of pass transistors to turn on in synchronization with a clock signal received from the load block, wherein the clock signal toggles to indicate the peak current is consumed in the load block.

3. The hybrid LDO regulator of claim 2, wherein the pass transistor array further comprises a plurality of NAND gates respectively corresponding to the plurality of pass transistors, and wherein each of the plurality of NAND gates is configured to provide an output signal to a gate of a corresponding pass transistor, from among the plurality of pass transistors, based on the clock signal and a control code.

4. The hybrid LDO regulator of claim 3, wherein the digital LDO regulator comprises a level shifter configured to generate the control code, and generate the control code in synchronization with the clock signal.

5. The hybrid LDO regulator of claim 2, wherein the digital LDO regulator further comprises a comparator configured to generate a selection signal based on a feedback voltage and a reference voltage, and wherein the controller is further configured to control a number of transistors among the plurality of pass transistors that are turned on based on the selection signal.

6. The hybrid LDO regulator of claim 5, wherein the digital LDO regulator further comprises a clock generator configured to generate a comparison clock signal based on the clock signal, and wherein the comparator further is configured to generate the selection signal in synchronization with the comparison clock signal.

7. The hybrid LDO regulator of claim 2, wherein the controller is further configured to control the pass transistor array to perform a coarse search operation in which at least two pass transistors among the plurality of pass transistors are turned on simultaneously.

8. The hybrid LDO regulator of claim 7, wherein the digital LDO regulator further comprises a comparator configured to generate a selection signal based on a feedback voltage and a reference voltage, and wherein the controller is further configured to repeatedly perform the coarse search operation until a voltage level of the feedback voltage becomes lower than a voltage level of the reference voltage.

9. The hybrid LDO regulator of claim 8, wherein the controller is further configured to repeatedly perform a fine search operation in which individual pass transistors, among the plurality of pass transistors, are turned on one by one.

10. The hybrid LDO regulator of claim 9, wherein the controller is further configured to maintain a state of the plurality of pass transistors based on a change in a voltage level of the selection signal.

11. The hybrid LDO regulator of claim 2, wherein the plurality of pass transistors comprises at least one large power transistor and at least one small power transistor, and wherein the controller is further configured to turn on the at least one large power transistor before the at least one small power transistor.

12. The hybrid LDO regulator of claim 1, wherein the analog LDO regulator comprises:

a voltage divider configured to generate a feedback voltage based on an output voltage at an output voltage terminal;

an amplifier configured to receive the feedback voltage and a reference voltage; and a pass transistor connected between a power supply voltage and the voltage divider, and configured to be turned on and off based on an output of the amplifier.

13. The hybrid LDO regulator of claim 12, further comprising a decoupling capacitor connected to the output voltage terminal.

14. A hybrid low drop-out (LDO) regulator comprising:

an analog LDO regulator configured to provide a first current corresponding to an average current consumed in a plurality of load blocks; and a digital LDO regulator configured to provide a second current corresponding to a peak current consumed by a load block, from among the plurality of load blocks, consuming the peak current based on information received from the load block indicating the peak current is consumed.

15. The hybrid LDO regulator of claim 14, wherein the digital LDO regulator comprises:

a pass transistor array comprising a plurality of pass transistors; and a controller configured to control at least one of the plurality of pass transistors to turn on in synchronization with a clock signal received from the load block, wherein the clock signal toggles to indicate the peak current is consumed in the load block.

16. The hybrid LDO regulator of claim 15, wherein the pass transistor array further comprises a plurality of NAND gates respectively corresponding to the plurality of pass transistors, and wherein each of the plurality of NAND gates is configured to provide an output signal to a gate of a corresponding pass transistor, from among the plurality of pass transistors, based on the clock signal and a control code.

17. The hybrid LDO regulator of claim 15, wherein the controller is further configured to control at least two pass transistors among the plurality of pass transistors to simultaneously turn on, based on the clock signal.

18. A user device comprising:

an application processor comprising at least one hybrid low drop-out (LDO) regulator; and a power management integrated circuit configured to provide power to the application processor, wherein the at least one hybrid LDO regulator comprises:

an analog LDO regulator configured to provide a first current corresponding to an average current consumed in a load block; and a digital LDO regulator configured to provide a second current corresponding to a peak current consumed by the load block based on information received from the load block indicating the peak current is consumed.

19. The user device of claim 18, wherein the digital LDO regulator comprises:

a pass transistor array comprising a plurality of pass transistors; and a controller configured to control at least one of the plurality of pass transistors to turn on in synchronization with a clock signal received from the load block, wherein the clock signal toggles to indicate the peak current is consumed in the load block.

20. The user device of claim 19, wherein the controller is further configured to control at least two pass transistors among the plurality of pass transistors to simultaneously turn on, based on the clock signal.

* * * * *